Aug. 19, 1969     I. J. GERSHEN     3,462,301

CASE FOR CONTACT LENSES

Filed June 19, 1967     2 Sheets-Sheet 1

INVENTOR
IRVIN J. GERSHEN

BY Rudolph␣Jurick
ATTORNEY

Aug. 19, 1969  I. J. GERSHEN  3,462,301
CASE FOR CONTACT LENSES
Filed June 19, 1967  2 Sheets-Sheet 2

INVENTOR
IRVIN J. GERSHEN
BY
Rudolph Hurick
ATTORNEY

United States Patent Office 3,462,301
Patented Aug. 19, 1969

3,462,301
CASE FOR CONTACT LENSES
Irvin J. Gershen, Springfield, N.J., assignor to Opticase, Inc., Newark, N.J., a corporation of New Jersey
Filed June 19, 1967, Ser. No. 646,917
Int. Cl. B08b 3/04; A45c 11/04
U.S. Cl. 134—155         5 Claims

ABSTRACT OF THE DISCLOSURE

Spring-biased piston elements, provided with ports, terminate in lens-supporting members normally projecting from the ends of a tubular case containing a liquid. The lens-supporting members are depressed into the case by means of caps attachable to the ends of the case, whereby the supported lenses are immersed in the liquid.

Background of the invention

The invention relates to a case for storing contact lenses when not in use.

It is desirable to maintain contact lenses immersed in a suitable solution, during periods of non-use, thereby to remove foreign matter from the lenses, to preserve the original polish of the lens surfaces and to provide desirable, constant hydration thereof.

Tubular cases provided with end caps and designed for the storage of contact lenses are known in the art but these suffer from numerous shortcomings. In certain prior devices, the case must be retained in a vertical position to prevent the escape of the solution upon removal of an end cap. In other devices, the lens-supporting arrangements are such that the curved surfaces of the lenses rest upon solid surfaces, thereby making it not only difficult to remove the lens but, also, increasing the possibility of scratching the lens surface.

In a contact lens case made in accordance with this invention, the lenses are supported in an edgewise position by spaced channel members, thereby facilitating the insertion and removal of the lenses and minimizing the possibility of damaging the lens surfaces. Furthermore, spring-biased pistons are provided to prevent the escape of the solution upon detachment of one or both end caps from the case.

Summary of the invention

Opposed, spring-biased pistons provided with drain ports, are slidably disposed within a tubular case having threaded ends for receiving end caps. Each piston terminates in spaced arms provided with facing channels for receiving a lens. Due to the action of the spring, these arms normally project from the ends of the case and the pistons are in engagement with a seat formed on the inner wall of the case, thereby formed a seal to prevent the escape of a contained liquid. Upon attachment of the end caps to the case, the pistons are depressed, and the liquid is forced to flow through the drain ports, thereby immersing the lenses in the liquid.

An object of this invention is the provision of an improved case for the storage of contact lenses immersed in a liquid.

An object of this invention is the provision of a case for contact lenses, said case being provided with means for supporting the lenses in edgewise positions, thereby facilitating the insertion and removal of the lenses with a minimum possibility of damage thereto.

An object of this invention is the provision of a tubular case containing a liquid, spring-biased pistons having drain ports and terminating in upstanding lens-retaining members which normally extend from the ends of the case, means preventing the escape of liquid from the case when the lens-retaining members are in the extended positions and end caps attachable to the case, said end caps depressing the lens-retaining members into the case whereby the liquid flows through the piston ports into contact with the contained lenses.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

Brief description of the drawings

In the drawings wherein like reference characters denote like parts in the several views:

Referring now to FIGURE 1 the tubular case is formed of two complementary sections made of a suitable plastic and identified by the numerals 10 and 10'. The upper section 10 comprises a body portion 11 having a hexagonal peripheral configuration and terminating in an externally-threaded portion 12 for receiving the upper end cap 13 having a knurled periphery. The integral case end 14 has a rectangular opening 15 formed therein, said opening having arcuate ends and the walls defining such opening being of increased thickness to form outer and inner seats 16 and 17 respectively. When the end cap 13 is fully threaded onto the threaded portion 12, the base of the cap is in flush, firm engagement with the outer seat 16, thereby forming a fluid-tight seal to prevent the escape of liquid from the case.

Figure 2:
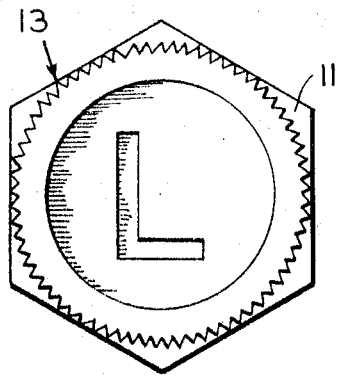
FIGURE 2 is a top plan view thereof.

The lower case section 10' is of the same construction and configuration as the described section 10, said section 10', however, having a groove 19 formed in the hexagonal portion 11' for receiving the circular lip 20 formed on the upper section 10. The two sections 10 and 10' are secured together by means of a suitable cement applied to the engaged ends, thereby forming a sturdy case. It is here pointed out that each of the case sections 10, 10' have internal bores of different diameters. Specifically, and with reference to FIGURE 3 the section 10 has a rectangular bore 22 communicating with a smaller, circular bore 23, and the section 10' has corresponding bores 22' and 23'.

Slidably disposed within the upper case section 10 is a hollow, cylindrical piston 24, provided with two, elongated drain ports 25, said piston having a lens-retainer 26 formed integrally therewith. A similar piston 24', having a lens-retainer 26', is slidably disposed within the lower case section 10'. The construction and operation of the pistons and lens-retainers will be described in detail below. The case is substantially filled with a suitable liquid and the two pistons are biased for movement in opposite directions by a compressed spring 27. Preferably, the upper end cap 13 carries a suitable marking, such as the letter L shown in FIGURE 2, to designate the particular contact lens to be inserted in this end of the case and, correspondingly, the lower end cap 13' carries the letter R.

Figure 1:
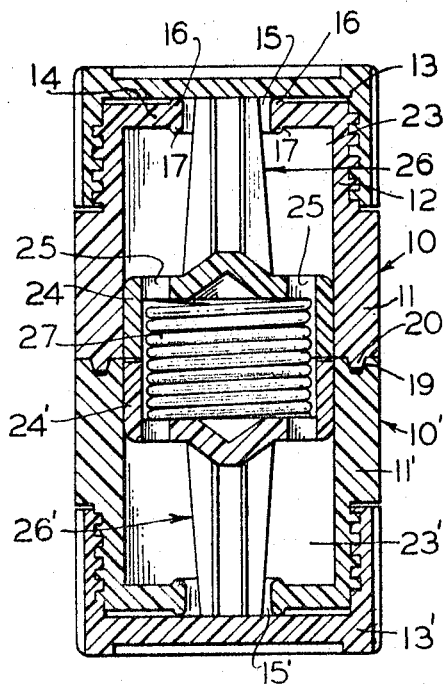
FIGURE 1 is a central, cross-sectional view of a contact lens case made in accordance with this invention.
Figure 5:
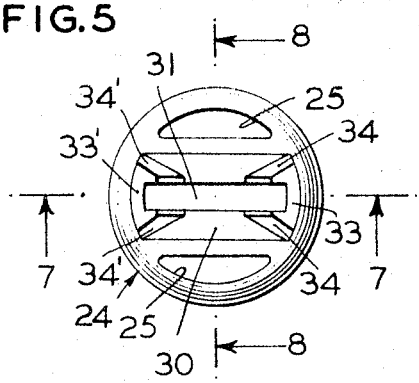
FIGURE 5 is a top plan view thereof.
Figure 6:
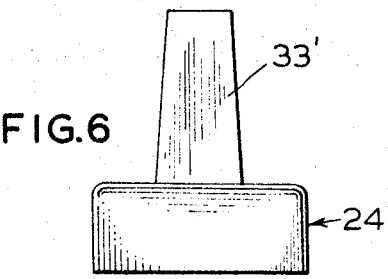
FIGURE 6 is a left side elevational view thereof.
Figure 7:
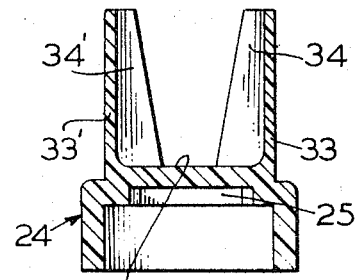
FIGURE 7 is a cross-sectional view taken along the line 7—7 of FIGURE 5.
Figure 4:
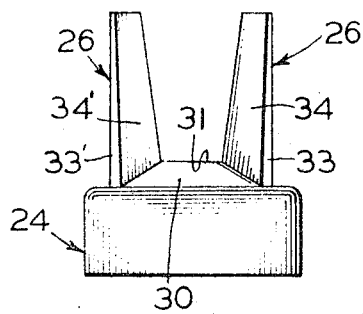
FIGURE 4 is a front elevational view of a lens-retainer and piston.
Figure 8:
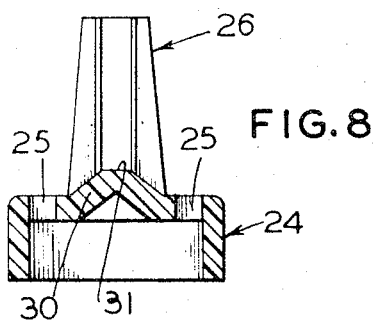
FIGURE 8 is a cross-sectional view taken along the line 8—8 of FIGURE 5.

Reference now is made to FIGURES 4–8 showing the upper, unitary piston 24 and lens-retainer 26. The base portion of the piston includes an upwardly-offset portion 30 terminating in a flat, diametrical ridge 31. The lens-retainer comprises two upstanding, spaced arms of generally U-shape in cross-section, such arms consisting of tapered end walls 33, 33' and tapered side walls 34, 34'. As shown in FIGURE 5, the elongated drain ports 25 are formed in the flat, base portion of the piston and are positioned to either side of the upwardly-offset portion 30. Further, it will be noted that the tapered end walls 33, 33' have outer surfaces of arcuate configuration. It is here pointed out that the configuration of the upwardly-offset portion 30 of the piston and the arcuate, outer surfaces of the upstanding end walls 33 and 33', taken in the plane containing the upper flat surface of the piston, is a rectangle with arcuate ends. Such configuration corresponds to that of the opening 15 formed in the end wall 14 of the upper case section 10, see FIGURE 1.

Figure 3:
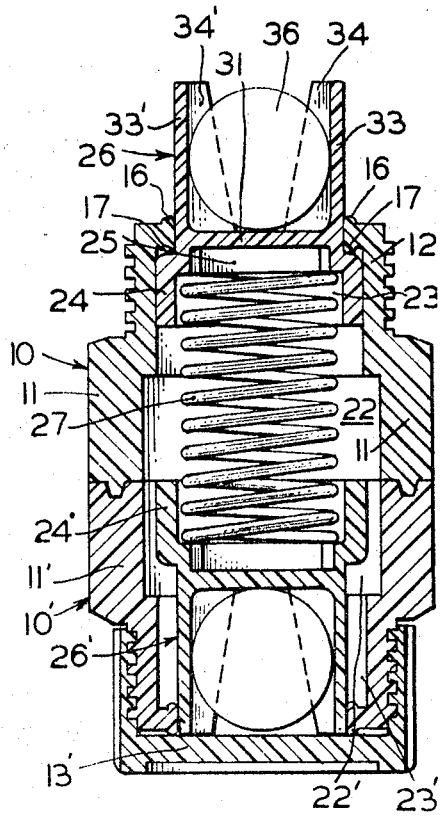
FIGURE 3 is a cross-sectional view similar to FIGURE 1 but taken along a plane perpendicular to that of FIGURE 1 and with the upper end cap detached from the case.

Referring again to FIGURE 1, it will be seen that with the end caps in place, the outer ends of the lens-retainers 26 and 26' extend into the corresponding openings 15, 15'. Under this condition, the liquid fills the two chambers defined by the small diameter bores 23 and 23'. As the end cap 13 is unscrewed the piston 24 moves upwardly under the action of the spring 27. During such upward movement of the piston, the liquid flows out of the chamber 23 through the two drain ports 25, by gravity. When the end cap is detached from the case, the flat base portion of the piston is pressed, firmly, against the inner seat 17, as shown in FIGURE 3, thereby forming a seal to prevent the escape of the liquid upon tilting of the case. The contact lens for the left eye, identified by the numeral 36, is placed into the lens-retainer 26. Such lens rests upon the ridge 31 and is retained in an edgewise position between the upstanding, spaced arms 33, 34 and 33', 34', which arms have lengths exceeding the diameter of the lens. With the case preferably disposed in the vertical position, the end cap is placed over the lens-retainer, pressed toward the case and then fully threaded onto the case, whereby the piston is returned to the position shown in FIGURE 1. During such downward movement of the piston, the liquid is forced to flow into the chamber 23 through the two drain ports 25. Due to the enlarged rectangular chambers 22 and 22', the volume of the contained liquid is such that the liquid fills the chamber 23, whereby the lens is completely immersed. The base of the end cap is in tight engagement with the outer seal 16, thereby forming a seal to prevent the escape of the liquid during transport of the case. The lower piston 24' and lens-retainer 26' function in a similar manner upon the removal and attachment of the end cap 13'.

Having now described the invention, those skilled in this art will be able to make various changes and modifications without thereby departing from the scope and spirit of the invention as recited in the following claims.

I claim:
1. A case for contact lenses comprising,
 (a) a tubular member adapted to contain a liquid and having end walls,
 (b) means forming aligned openings in the end walls, which openings are of generally rectangular configuration with arcuate ends of a given diameter,
 (c) a pair of opposed pistons having drain ports and slidably disposed within the tubular member, each piston having a pair of spaced upstanding arms formed integrally therewith and provided with facing channels extending longitudinally of the tubular member each pair of such arms constituting a lens-retainer and having arcuate outer surfaces of a diameter slightly less than the said given diameter,
 (d) spring means biasing the pistons into normal positions wherein the pistons are in engagement with the proximate end walls of the tubular member with the lens-retainer extending through the opening in the associated end wall, and
 (e) caps attachable to the ends of the tubular member.

2. The invention as recited in claim 1, including means forming internal and external seats on the said end walls along the margin of the walls defining said openings, said internal seats being engaged by the pistons to form fluid-tight seals when the pistons are in the said normal positions, and said external seats being engageable by the base portions of said caps to form a fluid-tight seal when the caps are attached to the tubular member.

3. The invention as recited in claim 1, wherein the tubular member has a central chamber of one cross-sectional area, which chamber communicates with cylindrical end chambers of a smaller cross-sectional area.

4. The invention as recited in claim 3, wherein the pistons are hollow and slidably within the said cylindrical chambers, and wherein said spring means is a compressed spring having ends extending into the pistons.

5. The invention as recited in claim 1, wherein the central portion of the tubular member has an outer surface of polygonal configuration, wherein the ends of the tubular member have external threads, and wherein the end caps have corresponding internal threads.

References Cited

UNITED STATES PATENTS

| | | | |
|---|---|---|---|
| 3,035,589 | 5/1962 | King | 206—5 XR |
| 3,070,105 | 12/1962 | Brown | 134—156 |
| 3,101,087 | 8/1963 | Watson | 206—5 XR |
| 3,211,281 | 10/1965 | Speshyock et al. | 206—5 |
| 3,378,020 | 4/1968 | Grabiel | 134—156 |

ROBERT L. BLEUTGE, Primary Examiner

U.S. Cl. X.R.
134—156; 206—5